Patented Nov. 24, 1953

2,660,592

UNITED STATES PATENT OFFICE 2,660,592

STABLE LEAD ALKYL COMPOSITIONS AND A METHOD FOR PREPARING THE SAME

George Calingaert, Geneva, N. Y., assignor to Ethyl Corporation, New York, N. Y., a corporation of New York No Drawing. Application March 18, 1952,
Serial No. 277,282

7 Claims. (Cl. 260—437)

This invention relates to alkyllead compositions which are stable at temperatures above 100° C. It also relates to methods for inhibiting the thermal decomposition of alkyllead compounds when subjected to temperatures above 100° C., at which temperature thermal decomposition becomes appreciable.

Generally my invention contemplates inhibiting the thermal decomposition of alkyllead compounds in which at least one valence of the lead is satisfied by an alkyl radical.

More specifically, my invention is concerned with an improved process for separating alkyllead compounds from the reaction products accompanying their synthesis. It is also applicable to a method for inhibiting thermal decomposition of an alkyllead product during its formation or during any step of the process including blending with other products in making the commercial antiknock fluid. It is applicable to minimizing the possibility of thermal decomposition during storage or transportation of an alkyllead product. It is especially applicable to preventing thermal decomposition of mixtures containing a high concentration of an alkyllead compound. The likelihood of thermal decomposition is more of a problem at high concentrations of lead alkyls, i. e., compositions above 80% by weight.

As is well known, tetraalkyllead antiknock compounds generally are produced by reacting an alloy of lead and a dissimilar metal usually sodium, with an alkylating agent such as alkyl halide, usually an alkyl chloride. The tetraalkyllead compound is produced thereby in admixture with various reaction by-products from which it must be separated. Separation is accomplished ordinarily by steam or vacuum distillation with subsequent purification of the tetraalkyllead distillate. Due to the toxic and unstable nature of tetraalkyllead antiknock compounds the foregoing process is subject to many difficulties.

In the manufacturing operations of alkyllead compounds meticulous temperature control and exact safety measures are of paramount importance. The rate of decomposition of the alkyllead compound increases rapidly with small rises in temperature above the temperature where thermal decomposition becomes appreciable. For example, decomposition of tetraethyllead occurs at the rate of approximately 2 per cent per hour at a temperature of 100° C., which is the customary temperature used in separating tetraethyllead from the reaction products accompanying its synthesis. At temperatures above 100° C. the decomposition rate increases logarithmically so that a point is soon reached where external heat is no longer required and decomposition becomes self-propagating.

Generally the manufacture of a tetraalkyllead, for example, tetraethyllead, involves the following steps: reaction, separation from reaction products, purification and blending. The reaction and separation steps of the alkyllead process which are conducted at or near decomposition temperatures require extensive and careful precautionary measures in order to minimize, and to provide for, excessive decomposition due to sudden and unavoidable increases in temperature.

Such likelihood of excessive decomposition is present also during blending, handling, storage and transportation. Prior to diluting the alkyllead concentrate with scavengers, gasoline or other materials, the alkyllead compound remains a concentrate and the problem of excessive thermal decomposition exists, even though the temperature is maintained normally well below that of decomposition. For example, in the purification step wherein the tetraethyllead concentrate is washed and blown with air at atmospheric temperature to remove impurities, a sudden increase in temperature may occur due to the oxidation of triethylbismuth which is present as an impurity. Also pumps used in handling tetraethyllead occasionally "freeze" and the friction developed may cause a local overheating to a temperature above the temperature of decomposition of the tetraethyllead. Faulty wiring, leaks onto steam pipes, and other accidental causes also may produce local overheating with resulting dangerous decomposition.

Therefore, it is an object of my invention to stabilize alkyllead compounds in which at least one valence of the lead is satisfied by an alkyl radical, against thermal decomposition during one or more of the following operations: manufacture, purification, blending, transportation and storage.

I accomplish this object by incorporating with alkyllead compounds a relatively small quantity of a material which I have found has the property of inhibiting and substantially preventing their decomposition when subjected to elevated temperature conditions. Furthermore, I accomplish this object by conducting one or more steps of the manufacturing process for the alkyllead compound, particularly the separation step, in the presence of such a material. The materials which I have found to possess this property are referred to hereinafter as "thermal stabilizers."

These thermal stabilizers are various different types of compounds. Fused-ring hydrocarbons and halogenated derivatives of these hydrocarbons are particularly effective, as well as unsaturated compounds having boiling points at least as high as 1° C. at atmospheric pressure. Of these unsaturated compounds best results are obtained when they are olefin hydrocarbons including aryl-substituted olefins. The substitution of halogens for part or all of the hydrogen atoms in such unsaturated compounds also gives highly effective thermal stabilizers.

Aliphatic nitro compounds, as well as aliphatic nitrates and aliphatic nitrites, form another very effective class of thermal stabilizers according to the present invention.

Compounds that have a boiling point below 1° C. at atmospheric pressure are of no appreciable value as thermal stabilizers. It appears that such compounds in addition to their low effectiveness are substantially insoluble in the alkyl-lead compounds to be stabilized, and can accordingly not be mixed with these compounds in the desired proportions.

I have found that my thermal stabilizers when used in amounts varying from 0.01 to 5.0 per cent by weight of the lead alkyl product are effective in substantially retarding or preventing thermal decomposition at temperatures above 100° C. for an extended period of time, e. g., ten to twenty hours at 130° C., which period is sufficient for all contemplated commercial applications.

A representative group of my thermal stabilizers are the following: crotonaldehyde, alloocimene, butadiene, di-amylene, dipentene, heptene, trimethylethylene, styrene, divinyl-benzene, cyclohexene, dicyclopentadiene, allyl iodide, hexachloropropylene, ethynylcyclohexanol, glyceryl monostearate, glycol dilaurate, tiglic alcohol, alloxan, azobenzene, 2,2'-azonaphthalene, 4-benzeneazo-1-naphthylamine, n-butyl nitrate, n-butyl nitrite, triphenylchlormethane, nitroethane, nitromethane, 2-nitro-2-methyl-1-propanol, p-nitro benzoic acid, p-nitroaniline, allyl isothiocyanate, anthracene, chrysene, naphthalene, alpha-methyl naphthalene, alpha-bromonaphthalene, chloronaphthalene, alpha-naphthol, beta-naphthol, naphthoresorcinol, beta-naphthoquinoline, tetrahydronaphthalene, indene, stearyl iodide, styrene dibromide, phloroglucinol, di-isobutylene, tetramethylethylene, tribromoethylene, oleic acid, cinnamic acid dibromide, maleic anhydride, phthalic anhydride, aluminum oleate, ethyl thiocyanate, hexachloroethane, 2-amino-2-methyl-1-propanol, 2-ethyl-1,3-hexanediol, iodoform, furfural, chlorophyll, lecithin, pyrophosphaditic acid, semi-carbazide hydrochloride, stilbene, methyl styrene, o-bromostyrene, p-chlorostyrene, o-ethylstyrene, o-chlorostyrene, aconitic acid, ethylene dibromide, resorcinol, 2,4,6-tri(dimethylaminomethyl)phenol, 2-methyl-2,4-pentanediol, ethylene bromohydrin, alpha-terpineol, acetyl aminothiophene, ethanolamine, p,p'-diaminodiphenylmethane, acridine, furfuryl alcohol, furfuryl amine, 8-hydroxyquinaldine, lepidine. Of these compounds the butadiene has the lowest boiling point, its boiling point being about 1° C. at atmospheric pressure.

To illustrate the effectiveness of the present invention, direct comparisons were made between the decomposition rates of unstabilized and stabilized tetraethyllead. A thermostatically controlled hot oil bath was fitted with a stirrer, thermometer, and a holder for a small reaction tube. A 100 c. c. gas buret beside the bath, and equipped with a water-containing levelling bottle, was connected by means of rubber tubing with the reaction tube after the desired sample was introduced into this tube. After the bath was brought to a steady temperature of 160° C., the sample-containing tube was quickly introduced and clamped with the levelling bottle adjusted to hold the gas buret in place at a zero reading. As the sample decomposed under the influence of the bath temperature, readings were taken over various periods of the amount of gases thus liberated, as indicated by the gas buret.

With pure tetraethyllead used in one milliliter amounts, 10 c. c. of gas was liberated in one minute, and 100 c. c. of gas in about six minutes. However, if to the same amount of tetraethyllead there is previously added 2% by weight of furfural or 2-ethyl-1,3-hexanediol, at the end of 100 minutes only four c. c. of liberated gas was shown. When 2% ethynyl-cyclohexinol is used instead of the other stabilizers, even less gas is liberated. The other stabilizers listed above showed about the same degree of effectiveness.

The liberation of gas is a very good index of the alkyl-lead decomposition. The principal decomposition products are metallic lead and hydrocarbon gas. When the decomposition becomes self-propagating, the rate of gas liberation changes from a gradual one to one that becomes very rapid. With the above stabilizers tested at 160° C., there was no serious rise in gas liberation rate. Normally, however, the decomposition of unstabilized tetraethyllead will become uncontrollable if it is heated to 130° C., whether this temperature is reached rapidly or slowly, unless it is possible to very rapidly cool it down to about 100° C. or below.

The above described behavior of the listed stabilizers also takes place with other alkyllead compounds such as triethyllead bromide and tetrapropyl lead. In fact these compounds when stabilized can be boiled and distilled at atmospheric pressure, something never before possible because they uncontrollably decompose before they can be heated to these temperatures.

My invention is adapted to the stabilization of tetraethyllead and other alkyllead compounds at various stages during synthesis, separation, purification and blending with other materials. For example one of my thermal stabilizers may be added to the reactants from which the alkyllead compound is produced, regardless of the particular reaction employed. Preferably it is added prior to the separation step which is conducted at a temperature close to the temperature where hazardous run-away decomposition is particularly prevalent. By adding one of my thermal stabilizers to the reaction mixture prior to distillation, the danger arising from unexpected temperature increases is substantially eliminated.

Also my thermal stabilizers may be employed to stabilize the alkyllead compound both in storage and in shipping and especially to stabilize any alkyllead concentrate. If elevated temperature conditions are likely to be encountered, the addition of a small amount of thermal stabilizer to the alkyllead compound will economically and satisfactorily eliminate most of the hazard involved.

While meticulous temperature control and exacting safety measures have been successful in reducing to a minimum the hazards of processing and handling of tetraethyllead, the use of my invention provides a factor of safety far beyond that presently enjoyed. Furthermore, waste of the alkyllead product due to decomposition is considerably minimized through the use of my invention.

My invention is useful in stabilizing alkyllead compounds in which at least one valence of the lead is satisfied by an alkyl radical. For example tetraethyllead, tetramethyllead, tetrapropyllead, dimethyldiethyllead, triethylphenyllead and triethyllead bromide can be successfully stabilized against thermal decomposition by incorporating therein a relatively small quantity of one of my stabilizers.

Depending upon the conditions to which said alkyllead compound is subjected or likely to be subjected, the stabilizer can be selected to be stable to oxidation and/or to be nonpolymerizable at the temperature of reaction of the alkyllead compound. It should be non-objectionable as contained in the final product, and if it is desired to distill the stabilized material, the stabilizer should have a vapor pressure within the range of the alkyllead product. Besides relative effectiveness, generally all the above properties should be taken into account in selecting the best commercial stabilizer for a given alkyllead compound.

As many apparently widely different embodiments of this invention may be made without departing from the spirit and scope hereof, it is to be understood that the invention is not limited to the specific embodiments hereof, except as defined in the appended claims.

This application is a continuation-in-part of my co-pending application, Serial Number 64,259, filed December 8, 1948.

What is claimed is:

1. A method of inhibiting the decomposition of an alkyllead compound comprising incorporating therewith a thermal stabilizer selected from the class consisting of glyceryl monostearate, glycol dilaurate, 2 - methyl - 2,4 - pentanediol, ethylene bromohydrin, furfuryl alcohol, ethynylcyclohexanol, tiglic alcohol, α-terpineol, crotonaldehyde, 2-amino-2-methyl-1-propanol, 2-ethyl-1,3-hexanediol and furfural.

2. A method of inhibiting the decomposition of a tetraethyllead concentrate comprising incorporating therewith from 0.01 to 5.0 per cent by weight of a thermal stabilizer selected from the class consisting of glyceryl monostearate, glycol dilaurate, 2 - methyl - 2,4 - pentanediol, ethylene bromohydrin, furfuryl alcohol, ethynylcyclohexanol, tiglic alcohol, α-terpineol, crotonaldehyde, 2-amino-2-methyl-1-propanol, 2-ethyl-1,3-hexanediol and furfural.

3. In a process of producing tetraethyllead by reacting a sodium-lead alloy with ethyl chloride and separating the thus produced tetraethyllead from the reaction mass by steam distillation, the step which comprises conducting said steam distillation in the presence of a thermal stabilizer selected from the class consisting of glyceryl monostearate, glycol dilaurate, 2-methyl-2,4-pentanediol, ethylene bromohydrin, furfuryl alcohol, ethynylcyclohexanol, tiglic alcohol, α-terpineol, crotonaldehyde, 2-amino-2-methyl-1-propanol, 2-ethyl-1,3-hexanediol and furfural.

4. A new composition comprising an alkyllead compound and a thermal stabilizer selected from the class consisting of glyceryl monostearate, glycol dilaurate, 2-methyl-2,4-pentanediol, ethylene bromohydrin, furfuryl alcohol, ethynylcyclohexanol, tiglic alcohol, terpineol, crotonaldehyde, 2-amino-2-methyl-1-propanol, 2-ethyl-1,3-hexanediol and furfural.

5. A new composition comprising at least eighty per cent by weight of tetraethyllead and less than five per cent of an organic thermal stabilizer selected from the class consisting of glyceryl monostearate, glycol dilaurate, 2-methyl-2,4-pentanediol, ethylene bromohydrin, furfuryl alcohol, ethynylcyclohexanol, tiglic alcohol, α-terpineol, crotonaldehyde, 2-amino-2-methyl-1-propanol, 2-ethyl-1,3-hexanediol and furfural.

6. The process which comprises distilling an alkyllead compound at atmospheric pressure from a mixture containing said alkyllead compound and a stabilizer selected from the class consisting of glyceryl monostearate, glycol dilaurate, 2-methyl-2,4-pentanediol, ethylene bromohydrin, furfuryl alcohol, ethynylcyclohexanol, tiglic alcohol, α-terpineol, crotonaldehyde, 2-amino-2-methyl-1-propanol, 2-ethyl-1,3-hexanediol and furfural.

7. In a process for steam distilling an alkyllead compound, the step of incorporating with said compound, before steam distillation, a thermal stabilizer selected from the class consisting of glyceryl monostearate, glycol dilaurate, 2-methyl-2,4-pentanediol, ethylene bromohydrin, furfuryl alcohol, ethynylcyclohexanol, tiglic alcohol, α-terpineol, crotonaldehyde, 2-amino-2-methyl-1-propanol, 2-ethyl-1,3-hexanediol and furfuryl.

GEORGE CALINGAERT.

References Cited in the file of this patent

UNITED STATES PATENTS

| Number | Name | Date |
| --- | --- | --- |
| 2,432,321 | Linch | Dec. 9, 1947 |